United States Patent
Mayer et al.

(10) Patent No.: US 11,507,803 B2
(45) Date of Patent: Nov. 22, 2022

(54) SYSTEM FOR GENERATING SYNTHETIC DIGITAL DATA FOR DATA MULTIPLICATION

(71) Applicant: Rohde & Schwarz GmbH & Co. KG, Munich (DE)

(72) Inventors: Timo Mayer, Munich (DE); Mikhail Volianskii, Mering (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 475 days.

(21) Appl. No.: 16/778,813

(22) Filed: Jan. 31, 2020

(65) Prior Publication Data
US 2021/0241074 A1    Aug. 5, 2021

(51) Int. Cl.
*G06N 3/04*    (2006.01)
*G06N 3/08*    (2006.01)

(52) U.S. Cl.
CPC .......... *G06N 3/0454* (2013.01); *G06N 3/08* (2013.01)

(58) Field of Classification Search
CPC ................................ G06N 3/0454; G06N 3/08
See application file for complete search history.

(56) References Cited

U.S. PATENT DOCUMENTS

| | | | | |
|---|---|---|---|---|
| 2018/0189677 A1* | 7/2018 | Anderson | ............. | G06N 20/00 |
| 2019/0274108 A1* | 9/2019 | O'Shea | ................ | G06N 3/0445 |
| 2020/0361083 A1* | 11/2020 | Mousavian | ........... | B25J 9/1697 |
| 2021/0042503 A1* | 2/2021 | Karras | ................ | G06N 3/0454 |

FOREIGN PATENT DOCUMENTS

| | | |
|---|---|---|
| CN | 108053454 A | 5/2018 |
| KR | 101843066 B1 | 5/2018 |
| KR | 101975186 B1 | 5/2019 |

(Continued)

OTHER PUBLICATIONS

O'Shea et al., "An Introduction to Deep Learning for the Physical Layer", Published in arXiv:1702.00832v2 [cS.IT], Jul. 2017, 13 pages.

(Continued)

*Primary Examiner* — David Bilodeau
(74) *Attorney, Agent, or Firm* — Ditthavong, Steiner & Mlotkowski (57) ABSTRACT

The invention relates to a system for generating synthetic digital data, comprising a receiver configured to receive a measured signal, in particular an RF signal, a converter configured to convert the measured signal to digital data representing signal characteristics of the measured signal, a trainable neural network encoder and a trainable neural network decoder, wherein, during a training routine, the neural network encoder is configured to receive the digital data and to generate a compressed representation of the digital data, and the neural network decoder is configured to generate a reconstruction of the digital data based on the compressed representation, and wherein the trained neural network decoder is configured to receive random or pseudorandom data and to generate synthetic digital data representing measured signal characteristics based on the random or pseudorandom data.

12 Claims, 7 Drawing Sheets

(56) References Cited

FOREIGN PATENT DOCUMENTS

WO      2019031794 A1      2/2019

OTHER PUBLICATIONS

Shi et al., "Generative Adversarial Network for Wireless Signal Spoofing", Published in WiseML 2019: Proceedings of the ACM Workshop on Wireless Security and Machine Learning, May 2019, 6 pages.
Davaslioglu et al., "Generative Adversarial Learning for Spectrum Sensing", Published in Published in: 2018 IEEE International Conference on Communications (ICC), May 2018, 6 pages.
Roy et al., "Detection of Rogue RF Transmitters using Generative Adversarial Nets", Published in: 2019 IEEE Wireless Communications and Networking Conference (WCNC), 7 pages.

* cited by examiner

SYSTEM FOR GENERATING SYNTHETIC DIGITAL DATA FOR DATA MULTIPLICATION

TECHNICAL FIELD OF THE INVENTION

The invention relates to the generation of synthetic data by neural networks. More specifically, the invention relates to a system and a method for generating synthetic digital data using neural network encoders and decoders, to a test method for a physical entity, to the use of synthetic data in a test method and to a computer program.

BACKGROUND OF THE INVENTION

New measurement and communication equipment is often tested before its implementation to evaluate the behavior and performance of the equipment. Such tests can be performed by feeding the equipment with data that is provided in the form of test sets or simulation sets. In this way, for example, the response of automotive sensors or communication devices to different environmental conditions can be tested before installing or implementing these devices.

The test and simulation sets are typically based on measurement data that was recorded by real world measurements or comprise such data. Thus, the amount of available measurement data limits the size of the test sets and the number of tests that can be performed. For non-standard scenarios, e.g. non-standard communication channels, only few data can exist, making it difficult to test such scenarios.

Furthermore, the data that is recorded with existing equipment can be confidential, such that it cannot be re-used as test data for testing new equipment.

It is known to generate artificial data based on a limited number of known data via machine learning techniques. Possible techniques for generating artificial data are principle component analysis, general adversarial networks (GAN), or variational autoenconders (VAE).

A general advisory network (GAN) usually comprise two neural networks that are trained simultaneously. One neural network tries to generate better artificial data while the other neural network tries to distinguish the generated data from the real data. This results in a competition between the two neural networks, which leads to the artificially generated data becoming more and more similar to real world data.

The document KR 101843066 B1, for instance, discloses the use of a modified GAN for generating and labeling data. A generator and a discriminator of the modified GAN are taught with real data and with information on a label to which the real data belongs. The modified GAN can generate similar artificial data and estimate a specific label for this data.

The document WO 2019/031794 A1 also discloses teaching a generator and a discriminator of a modification GAN with information of a label and with actual data in order generate similar artificial data.

The document CN 108053454 A disclose a method for generating graph-structure data based on deep convolutional generative adversarial networks (DCGAN). The document KR 101975186 B1 discloses the use of a GAN with a generator for generating a fake image based on input data, and a discriminating for identifying whether an image is fake or real.

It is also known to use GAN networks in the context of wireless communication technology. Examples for such uses can be found in: Shi, Yi, Kemal Davaslioglu, and Yalin E. Sagduyu, "Generative adversarial network for wireless signal spoofing", Proceedings of the ACM Workshop on Wireless Security and Machine Learning, 2019; Davaslioglu, Kemal, and Yalin E. Sagduyu, "Generative adversarial learning for spectrum sensing", 2018 IEEE International Conference on Communications (ICC), 2018; and Roy, Debashri, et al., "Detection of Rogue RF Transmitters Using Generative Adversarial Nets", IEEE WCNC, 2019.

In contrast, variational autoencoders (VAE) learn to distribute input data and to generate new data from the input data. They usually comprise of an encoder neural network, which is trained to encode input data, and a decoder neural network, which is trained to decode the encoded input data. For VAEs training data is required to cover the underlying parameter space. For example, VAEs can be used to generate artificial images based on a training set of real images.

A further application of VAEs is shown in T. O'Shea and J. Hoydis, "An Introduction to Deep Learning for the Physical Layer," in IEEE Transactions on Cognitive Communications and Networking, vol. 3, no. 4, pp. 563-575, 2017. Here, the VAE is used to optimize transmitter and receiver components in a communication system.

Thus, it is an objective to provide an improved system and an improved method for generating synthetic data, as well as an improved test method for physical entities, which avoid the above-mentioned disadvantages. In particular, it is an objective to provide a concept for generating synthetic data resembling data attained by real world measurements.

SUMMARY OF THE INVENTION

The object of the present invention is achieved by the solution provided in the enclosed independent claims. Advantageous implementations of the present invention are further defined in the dependent claims.

According to a first aspect, the invention relates to a system for generating synthetic digital data, comprising a receiver configured to receive a measured signal, in particular an RF signal, a converter configured to convert the measured signal to digital data representing signal characteristics of the measured signal, a trainable neural network encoder and a trainable neural network decoder, wherein, during a training routine, the neural network encoder is configured to receive the digital data and to generate a compressed representation of the digital data, and the neural network decoder is configured to generate a reconstruction of the digital data based on the compressed representation, wherein the trained neural network decoder is configured to receive random or pseudorandom data and to generate synthetic digital data representing measured signal characteristics based on the random or pseudorandom data. This achieves the advantage, that synthetic data resembling data attained by real world measurements can be generated efficiently on the basis of a limited set of measured signals.

The amount of generated synthetic data can far exceed that of the digital data that is based on a limited number of measured signals, thus achieving a multiplication of this data.

Furthermore, the synthetic data only resembles but is not identical to the data attained by real world measurements. Therefore, the synthetic data can replace the real world data in a scenario in which the real world data cannot be used for reasons of confidentiality.

In particular, the digital data fed to the neural network encoder for training is real world data generated on the basis of a real world measurement with a measurement device, e.g. a sensor.

The system for generating the synthetic digital data can comprise at least one processing unit, in particular a computer. The neural network encoder and/or the neural network decoder can be executed by the processing unit.

Preferably, the neural network encoder and the neural network decoder form a variational autoencoder (VAE).

The neural network encoder and the neural network decoder can comprise layers, wherein the neural network encoder comprises encoder layers and the neural network decoder comprises decoder layers. In particular, the neural network encoder and the neural network decoder can be configured as deep learning models.

In particular, the term trained neural network encoder respectively decoder refers to the neural network encoder respectively decoder after performing the training routine.

The compressed representation of the digital data can be a digital data pattern with a certain dimension, in particular with a lower dimension than the digital data generated by the converter based on the measured signal. The compressed representation can comprise a distribution over a latent space. Preferably, the compressed representation of the digital data comprises latent variable data and/or encoded data.

In particular, during the training routine, the neural network encoder is configured to convert the digital data to the compressed representation and the neural network decoder is configured to reconvert the compressed representation to the synthetic digital data.

The random or pseudorandom data can comprise a digital data pattern with the same dimension as the compressed representation. In particular, the random or pseudorandom data resembles the compressed representation.

In an embodiment, the system comprises a data storage, wherein the data storage is configured to store the digital data and the generated synthetic digital data, or wherein the data storage is configured to only store the generated synthetic digital data. This achieves the advantage that either a large data set, which includes both real world and synthetic data, can be provided, or a data set, which only includes synthetic data, can be provided. The latter can be used when the real world data is classified or should not be used for other reasons.

In an embodiment, the data storage comprises a physical memory and/or a cloud storage.

In an embodiment, the system comprises a transmitter, wherein the transmitter is configured to transmit the digital data and the generated synthetic digital data to a receiver device, or wherein the transmitter is configured to only transmit the generated synthetic digital data to the receiver device. This achieves the advantage that either a large data set, which includes both real world and synthetic data, can be provided, or a data set, which only includes synthetic data, can be provided. The latter can be used when the real world data is confidential or should not be used for other reasons.

The transmitter can comprise a communication interface, in particular a wireless communication interface.

The system can comprise the transmitter and the data storage.

Preferably, during the training routine the neural network encoder and/or the neural network decoder can be configured to compare the reconstructed digital data generated by the neural network decoder to the corresponding digital data fed to the neural network encoder. Furthermore, a processing unit, in particular the processing unit that executes the neural network encoder and decoder, can be configured to determine a loss function, representing a loss between the digital data and the corresponding reconstructed digital data. Subsequently, the neural network decoder can be configured to adapt the structure of its neural network based on the loss function.

All embodiments of the system for generating synthetic digital data can be combined.

According to a second aspect, the invention relates to a method for generating synthetic digital data, comprising the step of: feeding random or pseudorandom data to a trained neural network decoder, wherein the trained neural network decoder is configured to generate synthetic digital data representing measured signal characteristics based on the random or pseudorandom data, wherein the trained neural network decoder is obtainable by: a) receiving a measured signal, in particular an RF signal, at a receiver, b) converting the measured signal to digital data representing signal characteristics of the measured signal, c) feeding said digital data to a neural network encoder, wherein the neural network encoder is configured to generate a compressed representation of the digital data, and d) feeding the compressed representation of the digital data to the neural network decoder, wherein the neural network decoder is configured to generate a reconstruction of the digital data based on the compressed representation. This achieves the advantage, that synthetic data resembling data attained by real world measurements can be generated efficiently on the basis of a limited set of measured signals.

The amount of generated synthetic data can far exceed that of the digital data that is based on a limited number of measured signals, thus achieving a multiplication of this data. Furthermore, the synthetic data only resembles but is not identical to the data attained by real world measurements. Therefore, the synthetic data can replace the real world data in a scenario in which the real world data cannot be used for reasons of confidentiality.

In particular, the digital data fed to the neural network encoder for training is real world data generated on the basis of a real world measurement with a measurement device, e.g. a sensor.

In particular, the method for generating synthetic digital data is a computer-implemented method.

The neural network encoder and the neural network decoder can be executable by a processing unit, in particular a computer.

The neural network encoder and the neural network decoder can comprise layers. In particular, the neural network encoder comprises encoder layers and the neural network decoder comprises decoder layers. In particular, the neural network encoder and the neural network decoder are configured as a deep learning model.

The conversion of the measured signal to digital data representing signal characteristics of the measured signal can be performed by a converter.

The random or pseudorandom data can comprises a digital data pattern with the same dimension as the compressed representation. In particular, the random or pseudorandom data resembles the compressed representation.

In an embodiment, the digital data and the generated synthetic digital data are stored in a data storage, or only the generated synthetic digital data is stored in a data storage. This achieves the advantage that either a large data set, which includes both real world and synthetic data, can be provided, or a data set can be provided, which only includes synthetic data in case the real world data is confidential.

In an embodiment, the generated synthetic digital data are transmitted to a receiver device, or wherein only the generated synthetic digital data is transmitted to the receiver device. This achieves the advantage that either a large data set, which includes both real world and synthetic data, can be provided, or a data set can be provided, which only includes synthetic data in case the real world data is confidential.

In an embodiment, the measured signal and/or the digital data comprises RF channel measurement data, RF test drive data, RF field test data, time data and/or position data.

In an embodiment, the trained neural network decoder is further obtainable by: e) comparing the reconstructed digital data generated by the neural network decoder to the corresponding digital data fed to the neural network encoder, f) determining a loss function, representing a loss between the digital data and the corresponding reconstructed digital data, and g) adapting the neural network decoder based on the loss function.

Furthermore, also the neural network encoder can be trained. In particular, the neural network encoder is adapted to based on the loss function during the training.

All embodiments of the method for generating synthetic digital data can be combined.

According to a third aspect, the invention relates to a test method for a physical entity, in particular a communication channel or a measurement device, comprising feeding the entity with the synthetic data generated by the method according to the second aspect of the invention, and performing a real world measurement as to characteristics of the entity.

The physical entity can be a sensor, e.g. a radar or lidar device, a communication device, e.g. for 4G or 5G networks, or a signal generator. The physical entity can be an electronic instrument.

According to a fourth aspect, the invention relates to the use of synthetic digital data generated by the method according to the second aspect of the invention in a test method for a physical entity, in particular a test method according to the fourth aspect of the invention.

According to a fifth aspect, the invention relates to a computer program comprising a program code for performing the method according to the second aspect of the invention when executed on a computer.

BRIEF DESCRIPTION OF THE DRAWINGS

The invention will be explained in the followings together with the figures.

DETAILED DESCRIPTION OF THE PREFERRED EMBODIMENTS

Figure 1:
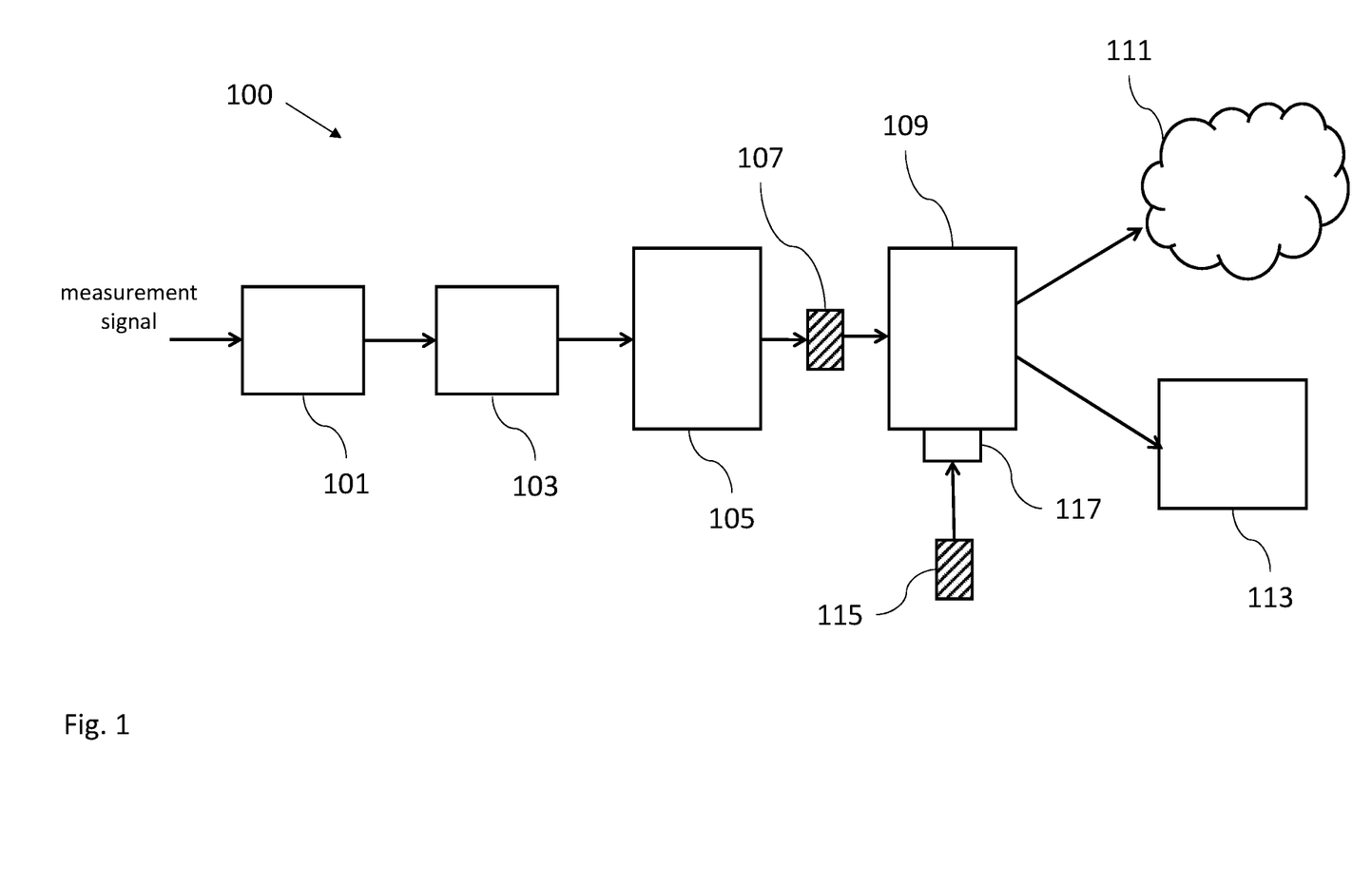
FIG. 1 shows a schematic diagram of system for generating synthetic digital data according to an embodiment.

FIG. 1 shows a schematic diagram of a system 100 for generating synthetic digital data according to an embodiment.

The system 100 comprises a receiver 101 configured to receive a measured signal, in particular an RF signal, a converter 103 configured to convert the measured signal to digital data representing signal characteristics of the measured signal, a trainable neural network encoder 105 and a trainable neural network decoder 109, wherein, during a training routine, the neural network encoder 105 is configured to receive the digital data and to generate a compressed representation 107 of the digital data, and the neural network decoder 109 is configured to generate a reconstruction of the digital data based on the compressed representation 107, and wherein the trained neural network decoder 109 is configured to receive random or pseudorandom data 115 and to generate synthetic digital data representing measured signal characteristics based on the random or pseudorandom data 115.

In particular, the neural network encoder 105 and the neural network decoder 109 form a variational autoencoder (VAE).

The receiver 101 and the converter 103 can form a data acquisition unit for receiving RF signals and converting them to original digital IQ data.

The neural network encoder 105 can form a data analysis unit configured to convert the original digital IQ data pattern into a digital data pattern with a certain dimension.

The neural network decoder 109 can form a data generation unit configured to reconvert data with reduced dimension into a synthetic digital IQ pattern.

The system 100 in FIG. 1 further comprises a data storage 111. The data storage 111 can comprise a physical memory and/or a cloud storage.

In an embodiment, the data storage 111 is configured to store the digital data and the generated synthetic digital data. In this way, a data set comprising all available data (synthetic and real) can be stored in the memory.

Alternatively, the data storage 111 can be configured to only store the generated synthetic digital data. In this way, a reuse or disclosure of the digital data can be prevented.

Preferably, the system 100 further comprises a transmitter 113. The transmitter 113 can comprise a communication interface for forwarding data to a receiver device.

In an embodiment, the transmitter 113 is configured to transmit the digital data and the generated synthetic digital data to the receiver device. In this way, a data set comprising all available data (synthetic and real) can be transmitted and reused at the receiver device, e.g., for use in a test case at the receiver device.

Alternatively, the transmitter 113 can be configured to only transmit the generated synthetic digital data to a receiver. In this way, it can be prevented that confidential digital data is forwarded to the receiver device.

The measured signal can be an RF signal. For instance, the measured signal is a signal in a wireless communication network, such as a 3G, 4G or 5G network.

The measured signal can be a sensor signal, e.g. a radar or lidar signal. The signal can comprise position or time information. The signal can further comprise an RF channel measurement signal, which, for instance, was measured with a channel sounder. In particular, the measured signal was measured by a measurement device, such as a sensor.

In particular, the signal is a test signal that is generated by a test measurement. For instance, the signal is an RF test signal generated during a field test of a device, e.g. a vehicle equipped with sensors.

The system 100 can further comprise an interface 117 for forwarding the random or pseudorandom data to the trained neural network decoder 109

A measurement device can comprise the system 100 for generating synthetic data. In particular, the measurement device can use the system 100 to generate synthetic test data based on measurement signals recorded with the device.

Figure 2A:
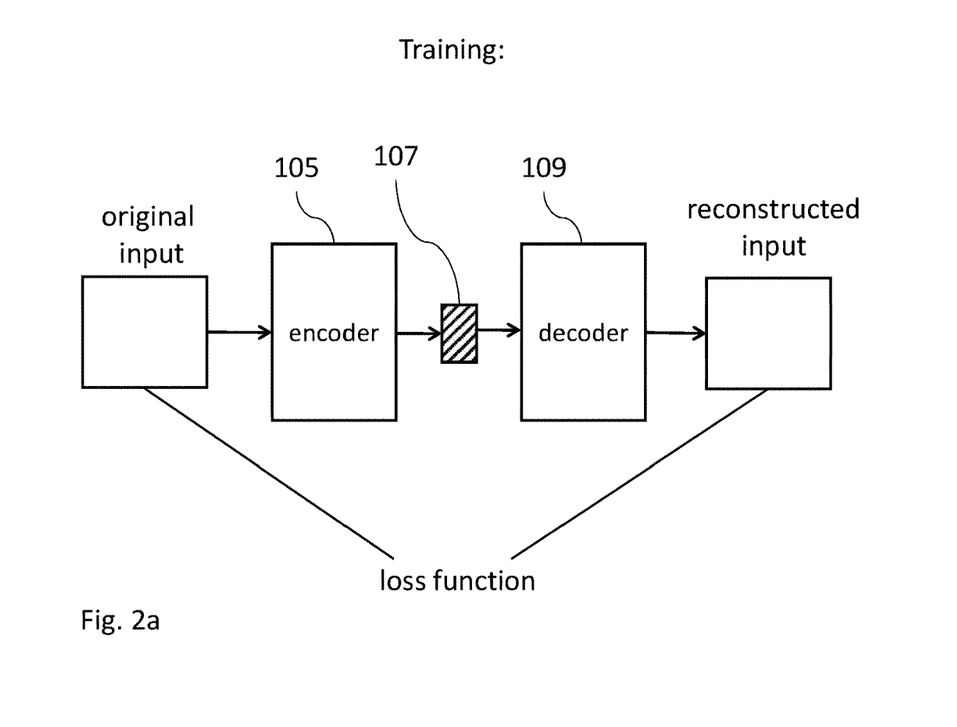
FIG. 2a shows a training routine of a neural network encoder and a neural network decoder according to an embodiment.

FIG. 2a shows a training routine of the neural network encoder 105 and the neural network decoder 109 according to an embodiment.

During the training digital data is fed to the encoder, which generates the compressed representation 107 of the digital data.

The compressed representation 107 of the digital data can comprise a digital data pattern with a certain dimension, in particular with a lower dimension than the digital data. In particular, the compressed representation 107 of the digital data comprises latent variable data.

The compressed representation is then fed to the neural network decoder 109 which is configured to generate a reconstruction of the digital data.

Subsequently, the input data can be compared to the reconstructed data, and a loss function can be determined, the loss function representing a loss, in particular an accuracy loss, between the data and the corresponding reconstructed data. In particular, the loss function represents a difference between the original data and the reconstructed data.

A processing unit of the system 100, in particular the processing unit that executes the neural network encoder 105 and decoder 109, can be configured to compare the datasets and determine the loss function.

Subsequently, the neural network decoder 109 and/or the neural network encoder 105 can be configured to adapt the structure of their respective neural network to based on the loss function, in particular to decrease the loss function.

The training routine shown in FIG. 2a can be repeated with a variety of data sets.

Figure 2B:
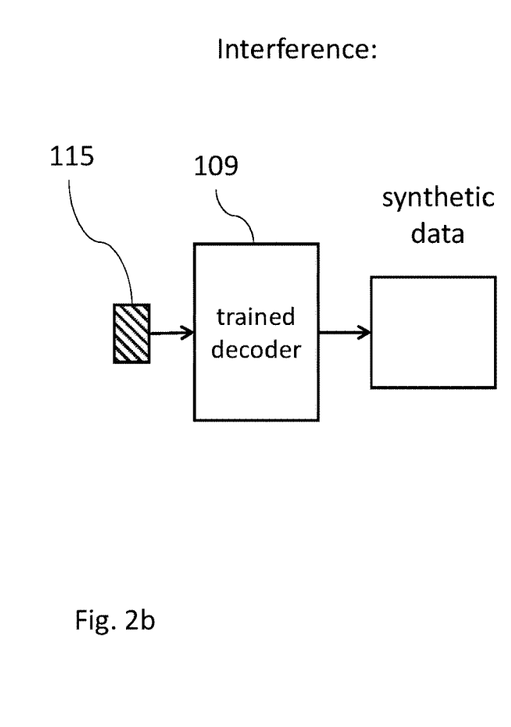
FIG. 2b shows the generation of synthetic digital data by a trained neural network decoder according to an embodiment.

FIG. 2b shows the generation of synthetic digital data by a trained neural network decoder 109 according to an embodiment.

For the generation of the synthetic data, the neural network decoder 109 is fed with random or pseudorandom data 115. On the basis of this data 115 and the previous training, the neural network decoder 109 is configured to generate synthetic digital data that resembles the original training data.

The random or pseudorandom data 115 can be generated by the system 100, in particular by a processing unit of the system 100, and/or can be stored in a memory of the system 100, in particular in the data storage 111.

The random or pseudorandom data 115 can comprises a digital data pattern with the same dimension as the compressed representation 107. The random or pseudorandom data 115 can comprise random noise.

Figure 3:
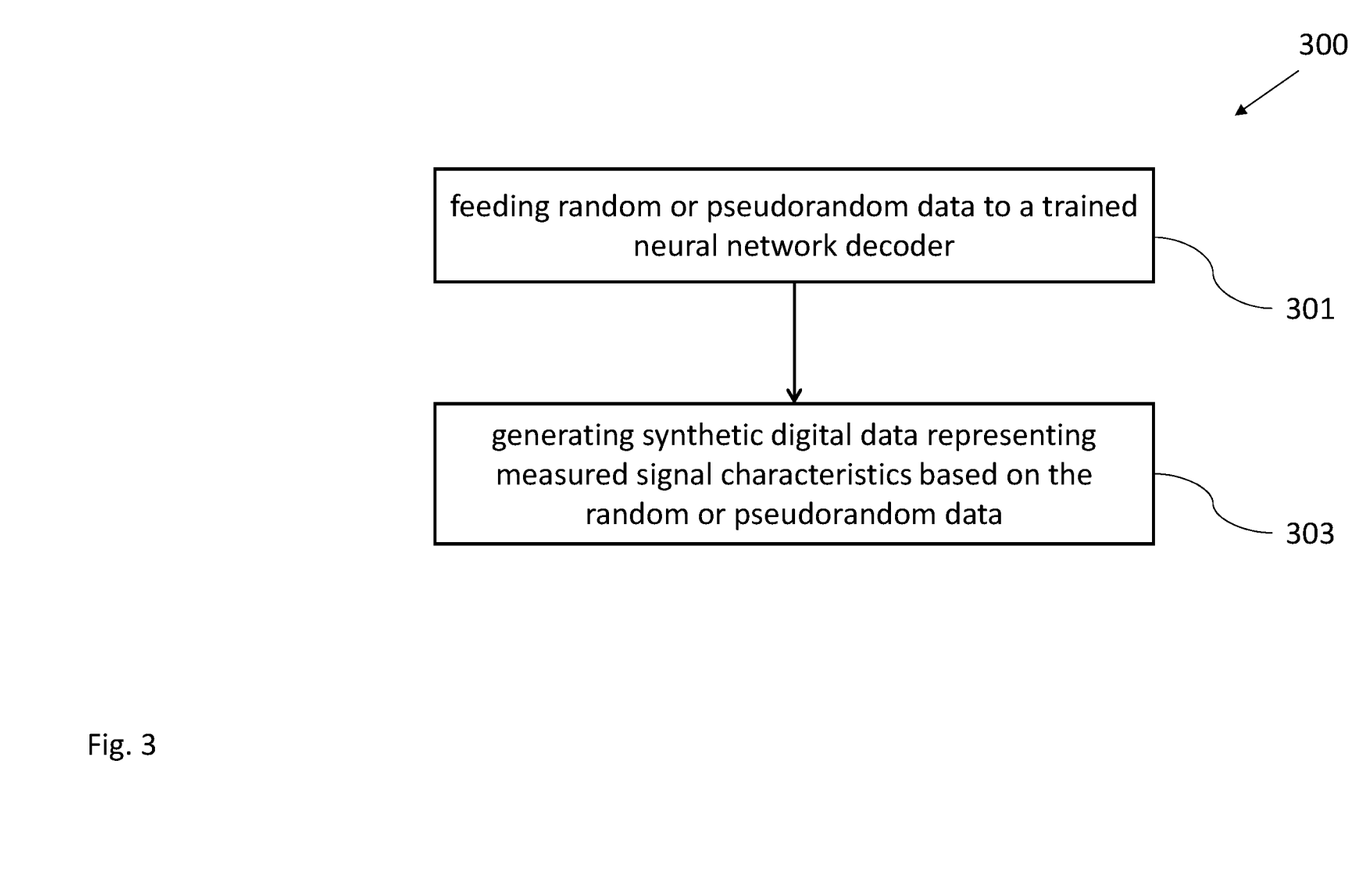
FIG. 3 shows a schematic diagram of a method for generating synthetic digital data according to an embodiment.

FIG. 3 shows a schematic diagram of a method 300 for generating synthetic digital data according to an embodiment.

The method 300 comprises the steps of: feeding 301 random or pseudorandom data 115 to the trained neural network decoder 109, and generating 303 synthetic digital data representing measured signal characteristics based on the random or pseudorandom data 115 by the neural network decoder.

Preferably, the digital data and the generated synthetic digital data are stored in the data storage 111, or only the generated synthetic digital data is stored in the data storage 111.

Preferably, the digital data and the generated synthetic digital data are transmitted to a receiver device, or only the generated synthetic digital data is transmitted to a receiver device.

The method 300 can be carried out by the system 100 shown in FIG. 1, in particular after training the neural network decoder 109.

Figure 4:
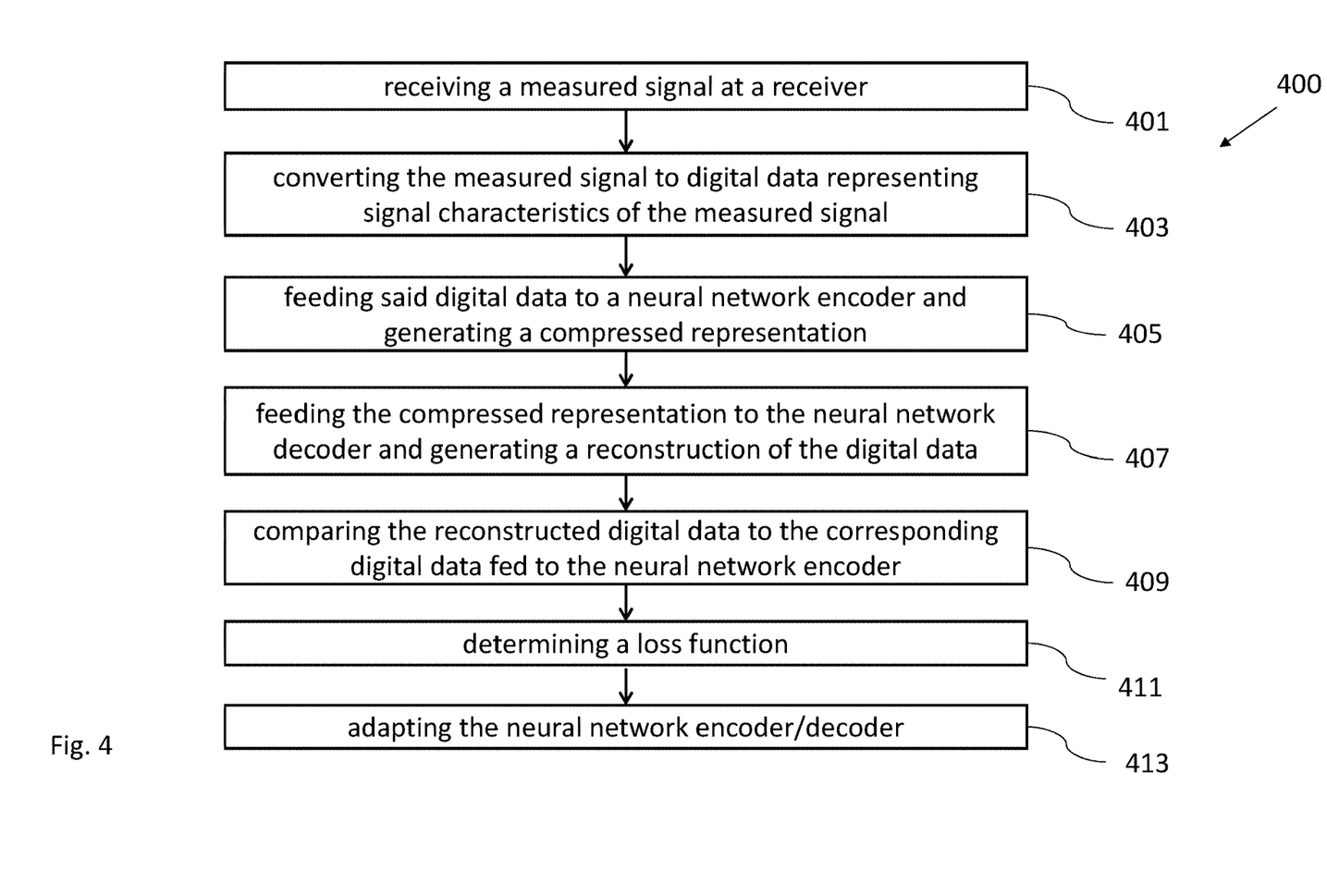
FIG. 4 shows a schematic diagram of a method for training a neural network decoder according to an embodiment.

FIG. 4 shows a schematic diagram of a method 400 for training the neural network decoder 109 according to an embodiment. In addition, the neural network encoder 105 can be trained by this method 400.

The method 400 comprises the steps of: receiving 401 a measured signal, in particular an RF signal, at the receiver 101, converting 403 the measured signal to digital data representing signal characteristics of the measured signal, feeding 405 said digital data to the neural network encoder 105, and generating the compressed representation 107 of the digital data via the neural network encoder 105, and feeding 407 the compressed representation 107 of the digital data to the neural network decoder 109, generating a reconstruction of the digital data based on the compressed representation 107 via the neural network decoder 109.

Preferably, the method 400 for training the neural network decoder 109 comprises the further steps of: comparing 409 the reconstructed digital data generated by the neural network decoder 109 to the corresponding digital data fed to the neural network encoder 105, determining 411 a loss function, representing an accuracy loss between the digital data and the corresponding reconstructed digital data, and adapting 413 the neural network decoder 109 and/or the encoder 105 based on the loss function.

In particular, the method 400 corresponds to the training routine for the neural network encoder 105 respectively decoder 109. The two terms training and training routine can be used equivalently.

The measured signal and/or the digital data comprises RF channel measurement data, RF test drive data, RF field test data, time data and/or position data.

Figure 5:
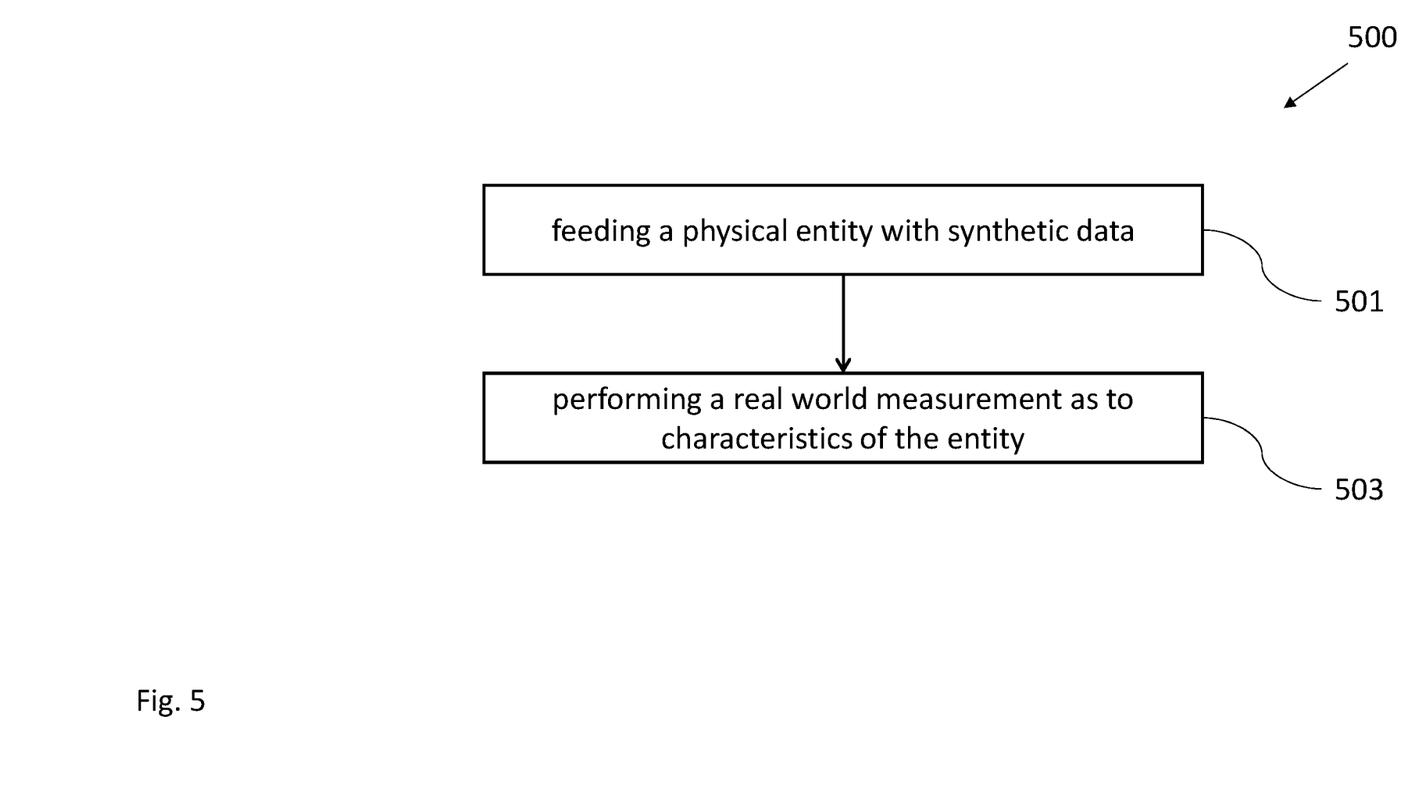
FIG. 5 shows a schematic diagram of a test method for a physical entity according to an embodiment.

FIG. 5 shows a schematic diagram of a test method 500 for a physical entity according to an embodiment.

The test method 500 comprises the steps of feeding 501 the entity with the synthetic digital data, and performing 503 a real world measurement as to characteristics of the entity.

In particular, the synthetic data is generated according to the method 300 shown in FIG. 3.

The physical entity can be a communication channel. The test method 500 can be used to test physical properties of the communication channel using synthetic data. This provides the advantage that the channel can be tested with a large dataset.

Furthermore, the test method 500 allows simulating and testing non-standard communication channels, for which only a small amount of measured data exists. Examples for non-standard channels are communication channels that are modulated by rotor movements of a helicopter or 5G networks used e.g. for industry automation.

A user, for instance, collects measured signals of such a non-standard channel using a channel sounder. The user can then generate further synthetic data based on the measured signals using the method 300 shown in FIG. 3 and subsequently use the synthetic data for testing the channel using the test method 500 shown in FIG. 5.

The physical entity can comprise various sensors and communication devices. For instance, the physical entity is a car, in particular a self-driving car.

The use of synthetic digital data in the test method 500 allows performing of a large number of test cases from a limited number of training sets based on data attained by real world measurements.

Furthermore, by using only synthetic data during the test method 500 it is possible to perform test without using data from measured signals. Thus, it is possible to perform tests if the real world data respectively the measured signals are confidential.

Figure 6:
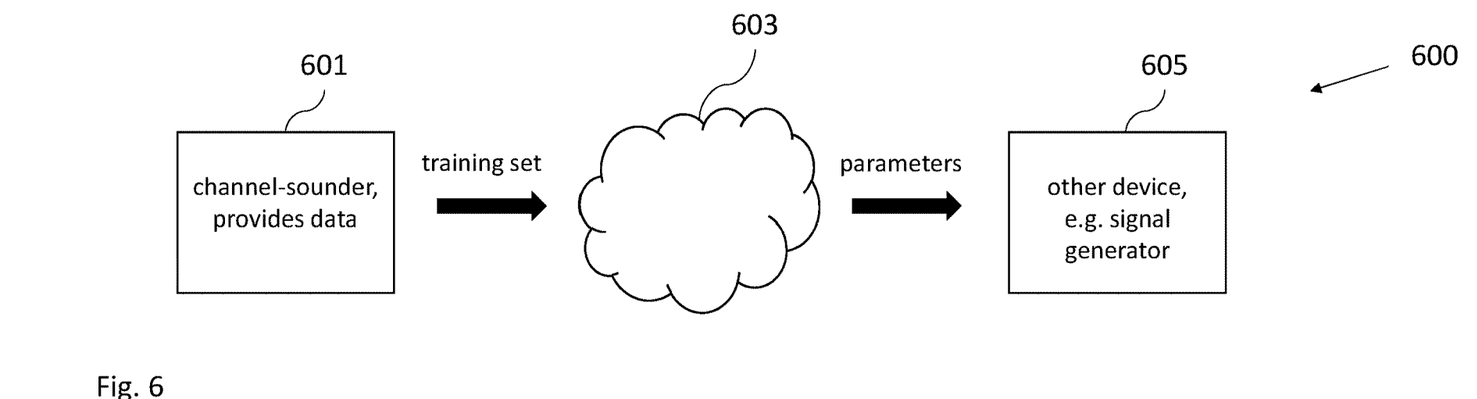
FIG. 6 shows a schematic diagram of an architecture for testing a non-standard communication channel according to an embodiment.

FIG. 6 shows a schematic diagram of an architecture 600 for testing a non-standard communication channel according to an embodiment.

The architecture 600 comprises a measurement device 601, such as a channel sounder, for collecting data of the non-standard communication channel. The data is forwarded to a system 603 for generated synthetic data, for instance the system 100 as shown in FIG. 1. In particular, the collected data is used to train the system 603. The system 603 generates synthetic data that can be forwarded to another device 605, e.g. a signal generator.

Figure 7:
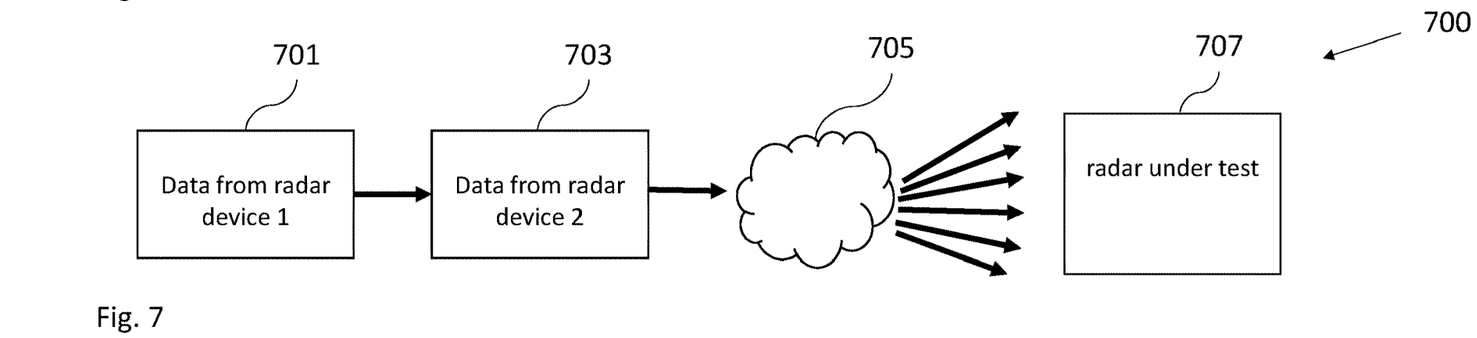
FIG. 7 shows a schematic diagram of an architecture for generating a large number of test cases from a limited number of training cases according to an embodiment.

FIG. 7 shows a schematic diagram of an architecture 700 for generating a large number of test cases from a limited number of training cases according to an embodiment.

The architecture 700 comprises at least one device 701, 703, for instance two radar devices, which generates a limited parameter set of measurements, e.g. 5-10 sets. These measurements can be interdependent. The parameter sets are forwarded to a system 705 for generating synthetic data, for instance the system 100 as shown in FIG. 1. In particular, the parameter sets are used to train a neural network decoder of the system 705.

The synthetic data generated by the system 705 can then be forwarded to another device 707, e.g. a radar under test for providing a test routine. The amount of synthetic data generated by the system 705 is not limited by the number of parameter sets provided by the devices 701, 703 and can be much larger than the number of parameter sets.

A further possible application of the architectures 600, 700 in FIG. 6 or 7 is a fading simulator for a signal generator. The system 603, 705 can generate a large number of artificial ARB files or channels from a few original files which were generated by a channel sounder. Preferably, the artificial ARB files are very similar to the ARB files generated by the channel sounder. Another advantage would be that the artificial data can be generated in real time by inference and therefore does not have to be stored in the signal generator.

The fading simulator can also be used for signal testing of a communication device. During these signal tests, data is sent to or received from the device, to either establish a successful communication connection with the device according to a communication standard or to measure the throughput. For analyzing a transmission path, communication channels are often simulated. In this context, artificial channel data could be generated by the system 603, 705 and subsequently used in a test environment that is close to reality.

The systems 603, 705 can also be used to generate data for mobile network testing. For instance, IQ data that was recorded during drive-tests can be multiplied and stored in a cloud. Furthermore, the systems 603, 705 can be used to generate synthetic data for environmental simulations with automotive radars from a limited set of parameters recorded by a radar in a real world measurement.

Furthermore, the systems 603, 705 can be used to generate synthetic data for channel testing to improve the performance of communication technology modems. Generally, these tests are either performed by using synthesized channel models which were generated on the basis of common channel modules, or by using realistic channel models which are based on real world measurements by a channel sounder. The latter are however only available in limited numbers. The systems 603, 705 can be used to multiply the channel sounder measurements in order to generate synthetic channel models that resembles channel modules based on real world measurements.

Figure 8:
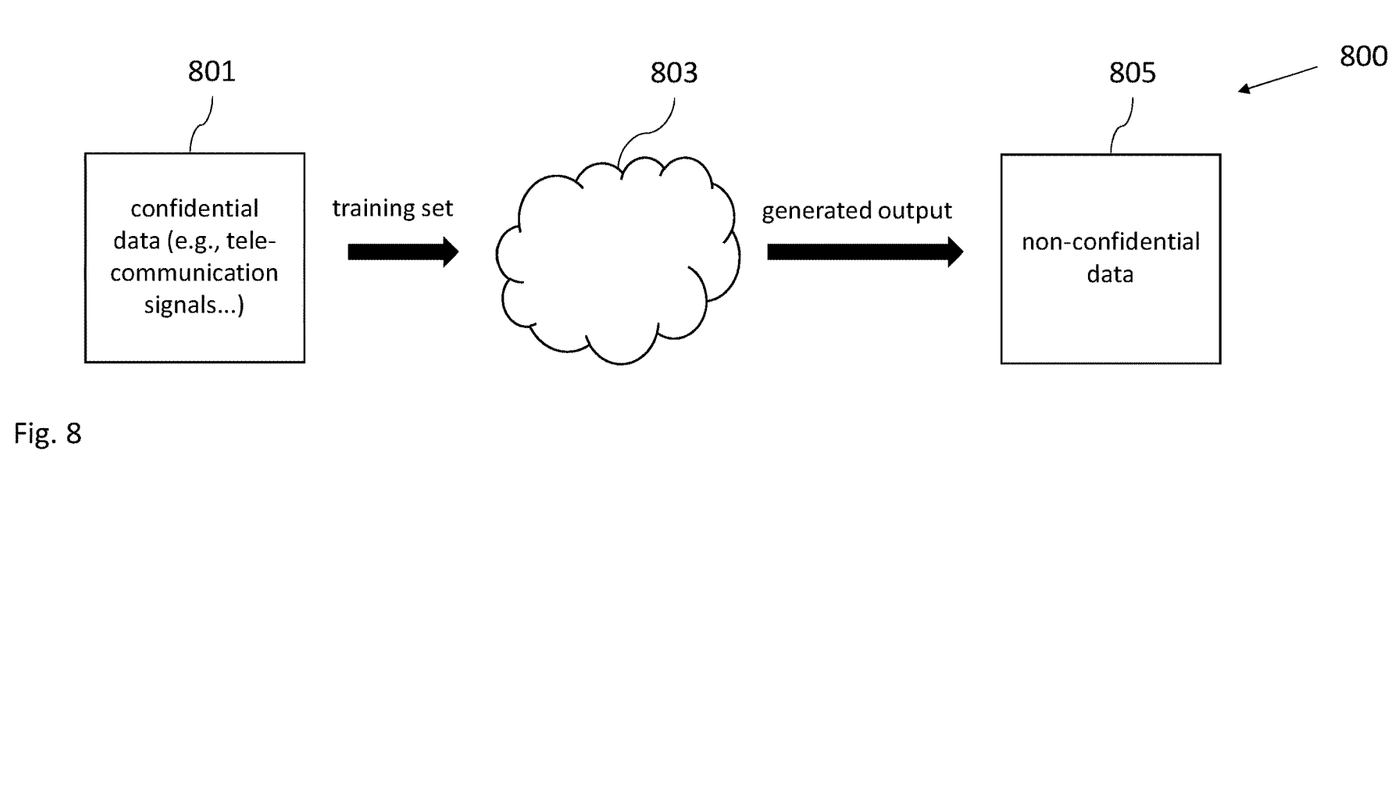
FIG. 8 shows a schematic diagram of an architecture for providing non-confidential synthetic data according to an embodiment.

FIG. 8 shows a schematic diagram of an architecture 800 for providing non-confidential synthetic data according to an embodiment.

The architecture 800 comprises a confidential data source 801 that, for instance, provides confidential telecommunication data to a system 803 for generating synthetic data, for instance the system 100 as shown in FIG. 1.

The trained system 803 can then generates synthetic non-confidential data 805 that can be used for the training of another telecommunication device.

The systems 603, 705, 803 for generating synthetic digital data in FIGS. 6, 7 and 8 can be implemented as cloud computing systems.

All features of all embodiments described, shown and/or claimed herein can be combined with each other.

The invention claimed is:

1. A system for generating synthetic digital data, comprising:
   a receiver configured to receive a measured signal, in particular an RF signal,
   a converter configured to convert the measured signal to digital data representing signal characteristics of the measured signal,
   a trainable neural network encoder and a trainable neural network decoder,
   wherein, during a training routine, the neural network encoder is configured to receive the digital data and to generate a compressed representation of the digital data, and the neural network decoder is configured to generate a reconstruction of the digital data based on the compressed representation, and wherein the trained neural network decoder is configured to receive random or pseudorandom data and to generate synthetic digital data representing measured signal characteristics based on the random or pseudorandom data.

2. The system of claim 1, comprising a data storage, wherein the data storage is configured to store the digital data and the generated synthetic digital data, or wherein the data storage is configured to only store the generated synthetic digital data.

3. The system of claim 2, wherein the data storage comprises a physical memory and/or a cloud storage.

4. The system of claim 1, comprising a transmitter, wherein the transmitter is configured to transmit the digital data and the generated synthetic digital data to a receiver device, or wherein the transmitter is configured to only transmit the generated synthetic digital data to the receiver device.

5. A method for generating synthetic digital data, comprising the step of:
- feeding random or pseudorandom data to a trained neural network decoder,
- wherein the trained neural network decoder is configured to generate synthetic digital data representing measured signal characteristics based on the random or pseudorandom data,
- wherein the trained neural network decoder is obtainable by:
  a) receiving a measured signal, in particular an RF signal, at a receiver,
  b) converting the measured signal to digital data representing signal characteristics of the measured signal,
  c) feeding said digital data to a neural network encoder, wherein the neural network encoder is configured to generate a compressed representation of the digital data, and
  d) feeding the compressed representation of the digital data to the neural network decoder, wherein the neural network decoder is configured to generate a reconstruction of the digital data based on the compressed representation.

6. The method of claim 5, wherein the digital data and the generated synthetic digital data are stored in a data storage, or wherein only the generated synthetic digital data is stored in the data storage.

7. The method of claim 5, wherein the digital data and the generated synthetic digital data are transmitted to a receiver device, or wherein only the generated synthetic digital data is transmitted to the receiver device.

8. The method of claim 5, wherein the measured signal and/or the digital data comprises RF channel measurement data, RF test drive data, RF field test data, time data and/or position data.

9. The method of claim 5, wherein the trained neural network decoder is further obtainable by: e) comparing the reconstructed digital data generated by the neural network decoder to the corresponding digital data fed to the neural network encoder, f) determining a loss function, representing a loss between the digital data and the corresponding reconstructed digital data, and g) adapting the neural network decoder based on the loss function.

10. A test method for a physical entity, in particular a communication channel or a measurement device, comprising feeding the entity with the synthetic data generated according to the method of claim 5, and performing a real world measurement as to characteristics of the entity.

11. Use of synthetic digital data generated according to the method of claim 5 in a test method for a physical entity.

12. A computer program comprising a program code for performing the method of claim 5 when executed on a computer.

* * * * *